United States Patent
Sinha

(10) Patent No.: US 6,657,321 B2
(45) Date of Patent: Dec. 2, 2003

(54) DIRECT CURRENT UNINTERRUPTIBLE POWER SUPPLY METHOD AND SYSTEM

(75) Inventor: Gautam Sinha, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 126 days.

(21) Appl. No.: 09/682,651

(22) Filed: Oct. 2, 2001

(65) Prior Publication Data
US 2003/0062775 A1 Apr. 3, 2003

(51) Int. Cl.[7] .............................. H01F 1/00
(52) U.S. Cl. ............... 307/68; 307/46; 307/78
(58) Field of Search ............ 307/64, 66, 68, 307/44–47, 75–78

(56) References Cited

U.S. PATENT DOCUMENTS

| | | | | |
|---|---|---|---|---|
| 4,059,770 A | * | 11/1977 | Mackay | 290/4 C |
| 5,198,698 A | * | 3/1993 | Paul et al. | 307/64 |
| 5,767,591 A | * | 6/1998 | Pinkerton | 307/64 |
| 5,867,017 A | * | 2/1999 | Merwin et al. | 323/320 |
| 5,920,129 A | * | 7/1999 | Smith | 307/64 |
| 6,014,015 A | * | 1/2000 | Thorne et al. | 322/15 |
| 6,281,595 B1 | | 8/2001 | Sinha et al. | |

OTHER PUBLICATIONS

U.S. patent application, Ser. No. 09/617,954, Filed Sep. 25, 2000, Entitled A Starting System and Method for a Microturbine Power Generation Unit by G. Sinha.

U.S. patent application, Ser. No. 09/681,697, Filed May 23, 2001, Entitled " Low–Energy Storage Fast–Start Uninterruptible Power Supply System and Method" by Robert D. King, et al.

U.S. patent application, Ser. No. 09/559,420, Filed Apr. 26, 2000, Entitled " Distributed Electrical Power Management System for Remote Power Generators and Method of Operation", by G. Sinha, et al.

* cited by examiner

Primary Examiner—Gregory J. Toatley, Jr.
Assistant Examiner—Sharon A. Polk
(74) Attorney, Agent, or Firm—Ann M. Agosti; Patrick K. Patnode

(57) ABSTRACT

A method and system are described for providing a direct current (DC) uninterruptible power supply with the method including, for example: continuously supplying fuel to a turbine; converting mechanical power from the turbine into alternating current (AC) electrical power; converting the AC electrical power to DC power within a predetermined voltage level range; supplying the DC power to a load; and maintaining a DC load voltage within the predetermined voltage level range by adjusting the amount of fuel supplied to the turbine.

19 Claims, 2 Drawing Sheets

DIRECT CURRENT UNINTERRUPTIBLE POWER SUPPLY METHOD AND SYSTEM

FEDERAL RESEARCH STATEMENT

This invention was made with United States Government support under contract number DEFC 02 000H 11063 awarded by the United States Department of Energy. The United States Government has certain rights in the invention.

BACKGROUND OF INVENTION

The invention relates generally to a method and system for using turbines in direct current (DC) critical power systems.

In many critical power applications, such as in the telecommunications industry, loads require uninterruptible DC power at a fixed voltage such as −24 VDC (volts DC), −48 VDC, or −96 VDC, for example. Such critical power applications typically are set up to selectively receive power at a standard voltage and frequency from a utility grid and from a backup generator. A transfer switch is used to control whether the power is received from the utility grid or the generator. Typically such critical power applications use power from the utility grid when the utility grid is operational and from the backup generator when the utility grid is not operational. The resulting AC power is rectified to produce DC power at a regulated DC voltage. Typically, a DC energy storage system such as a battery bank with matched DC voltage is additionally connected to the load. Such storage systems are sized to meet the load requirements either until the backup generator comes on-line or for a predetermined period of time (such as a 6–8 hour ride-through capability for a plant). Such storage systems have a very large footprint. For example, a lead acid battery bank for a light industrial application requiring 200 kilowatt (kW) ride-through for 8 hours typically comprises at least 150 square feet of batteries stacked 3 feet high. Such a configuration becomes expensive in an urban environment and presents numerous maintenance and logistical issues.

It would therefore be desirable to have an uninterruptible power supply system and method which does not require large energy storage systems and which is adapted to efficiently supply regulated DC power to a load while maintaining a substantially constant predetermined DC load voltage level.

SUMMARY OF INVENTION

Briefly, in accordance with one embodiment of the present invention, a method for providing a direct current (DC) uninterruptible power supply comprises: continuously supplying fuel to a turbine; converting mechanical power from the turbine into alternating current (AC) electrical power; converting the AC electrical power to DC power within a predetermined voltage level range; supplying the DC power to a load; and maintaining a DC load voltage within the predetermined voltage level range by adjusting the amount of fuel supplied to the turbine.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
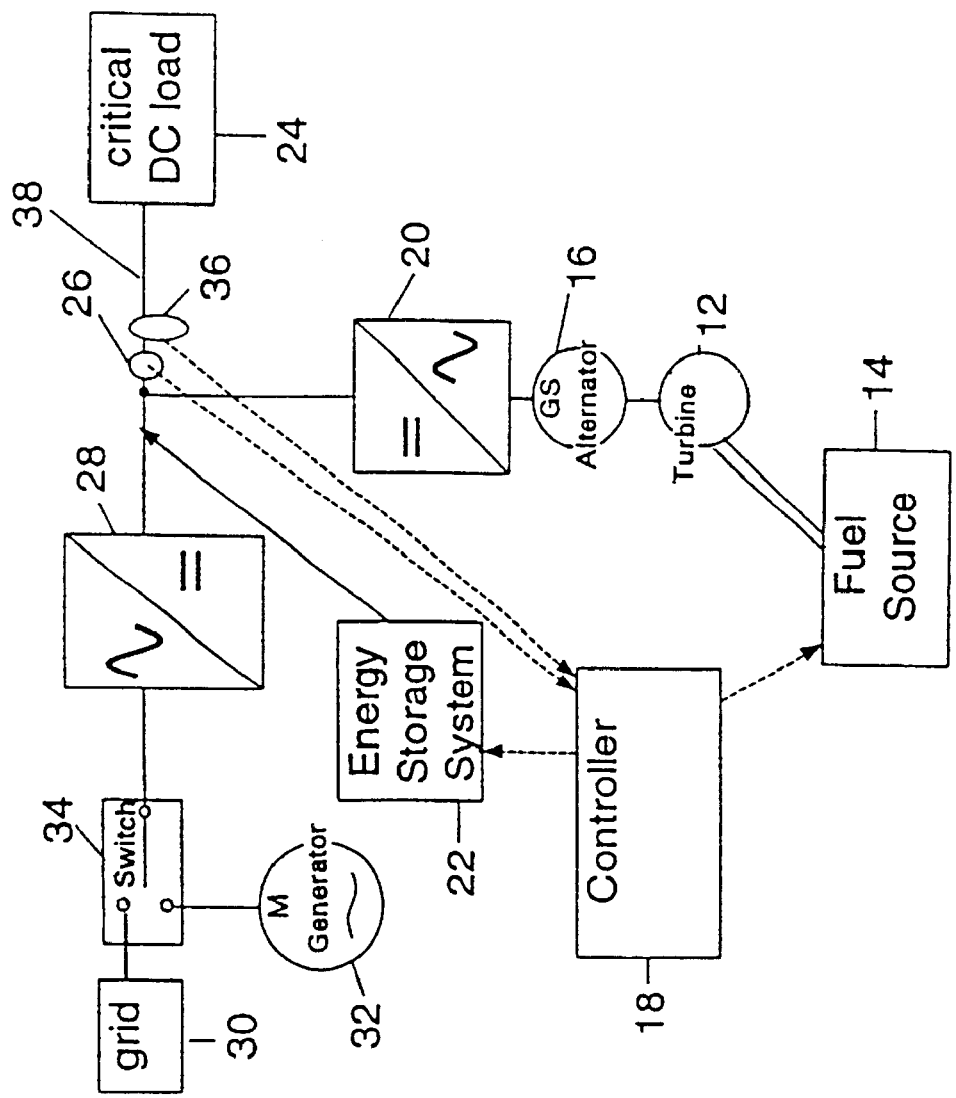
FIG. 1 is a block diagram of a DC uninterruptible power supply system in accordance with several embodiments of the present invention.

FIG. 1 is a block diagram of a DC uninterruptible power supply system 10 in accordance with several embodiments of the present invention wherein system 10 comprises: a turbine 12; a fuel source 14 adapted to continuously supply fuel to the turbine during normal UPS system operation; an alternator 16 adapted to convert mechanical power from the turbine into alternating current (AC) power; a turbine rectifier 20 adapted to convert AC power from the alternator to direct current (DC) power within a predetermined voltage level range for use by a load 24; and a controller 18 configured (via software, hardware, or a combination thereof) to maintain a DC load voltage within the predetermined voltage level range by adjusting the amount of fuel supplied by the fuel source to the turbine. In one example, the predetermined range inclusively comprises a nominal voltage level plus or minus about 12.5 percent of the nominal voltage value. As one example, for a 48 VDC nominal system, the predetermined voltage level range inclusively extends from about 42 VDC to about 54 VDC. Typical DC load voltages are 24 VDC, 48 VDC, 96 VDC or other industry standards.

Load 24 may comprise one or more systems, appliances, or devices requiring DC power, for example. Fuel source 14 may comprise any appropriate fuel source for providing the fuel for the turbine. Typical types of fuels include, for example, natural gas fuels, diesel fuels, alcohol-based fuels (such as methanol and ethanol), and mixtures thereof. By continuously supplying fuel, the turbine is ready to supply the load when required and the response time is reduced.

Turbine 12 may comprise any machine suitable for receiving fuel and providing mechanical power. Several non-limiting examples of turbines for use in embodiments of the present invention include microturbines, turbo-generators, and gas turbines. A microturbine, for example, is a high speed turbo-machine such that alternator 16, when mechanically coupled to a shaft (not shown) of the microturbine converts mechanical power from the microturbine to electrical power at a high frequency. A 200 kW microturbine can be expected to generate rated power at about 833 Hz for example. Spinning at high speeds enables microturbines to produce correspondingly high frequencies from the alternator. Conventional engines such as reciprocating diesel engines are designed to produce lower mechanical speeds typically in the range of about 1800 RPM to about 2200 RPM and have shafts which are mechanically geared up using a gearbox or the pole count in the generator made equal to 4 in order to produce AC power at 60 Hz. As used in context herein, "high frequency" is meant to include frequencies greater than 60 Hz. Alternator 16 may comprise any alternator adapted to convert mechanical power into AC power. Several examples include radial or axial flux based permanent magnet alternators and induction generator rotor excitation alternators.

The voltage and frequency of the AC power from alternator 16 vary with the electrical load. Turbine 12 is typically designed to produce a predetermined power at a predetermined speed. When alternator 16 comprises a permanent magnet alternator, the terminal voltage of the alternator is proportional to the speed. Therefore, for instance, a turbine-alternator combination can produce up to about 60% of rated power when the turbine spins at about 60% of rated speed and has a voltage about 60% of rated voltage. Rectifier 20 may comprise any one of a number of topologies for performing the AC to DC rectification function. In one embodiment, for example, rectifier 20 comprises an three phase active rectifier.

Controller 18 may comprise any appropriate controller such as for example, one or more computers, microprocessors, digital signal processors, or combinations thereof. Controller 18 uses information about the load voltage to control turbine 12. For example, in one embodiment, controller 18 is configured to cause the fuel source (i) to continuously supply a minimum level of fuel to the turbine during normal UPS system operation, (ii) to supply an increased level of fuel in response to a deficiency in DC load voltage, and, in the event that an increased level of fuel has been supplied, (iii) to supply a decreased level of fuel in response to an excess in DC load voltage. Controller 18 may further be configured to cause the fuel source to supply a decreased level of fuel in response to a user command. Being responsive to a user command provides flexibility and the opportunity for a user to temporarily shut down the turbine for maintenance or repair. "Normal UPS system operation" is meant to encompass UPS system operation when such shut downs are not occurring. The "user" may be a human operator or a separate controller (not shown), for example.

Figure 2:
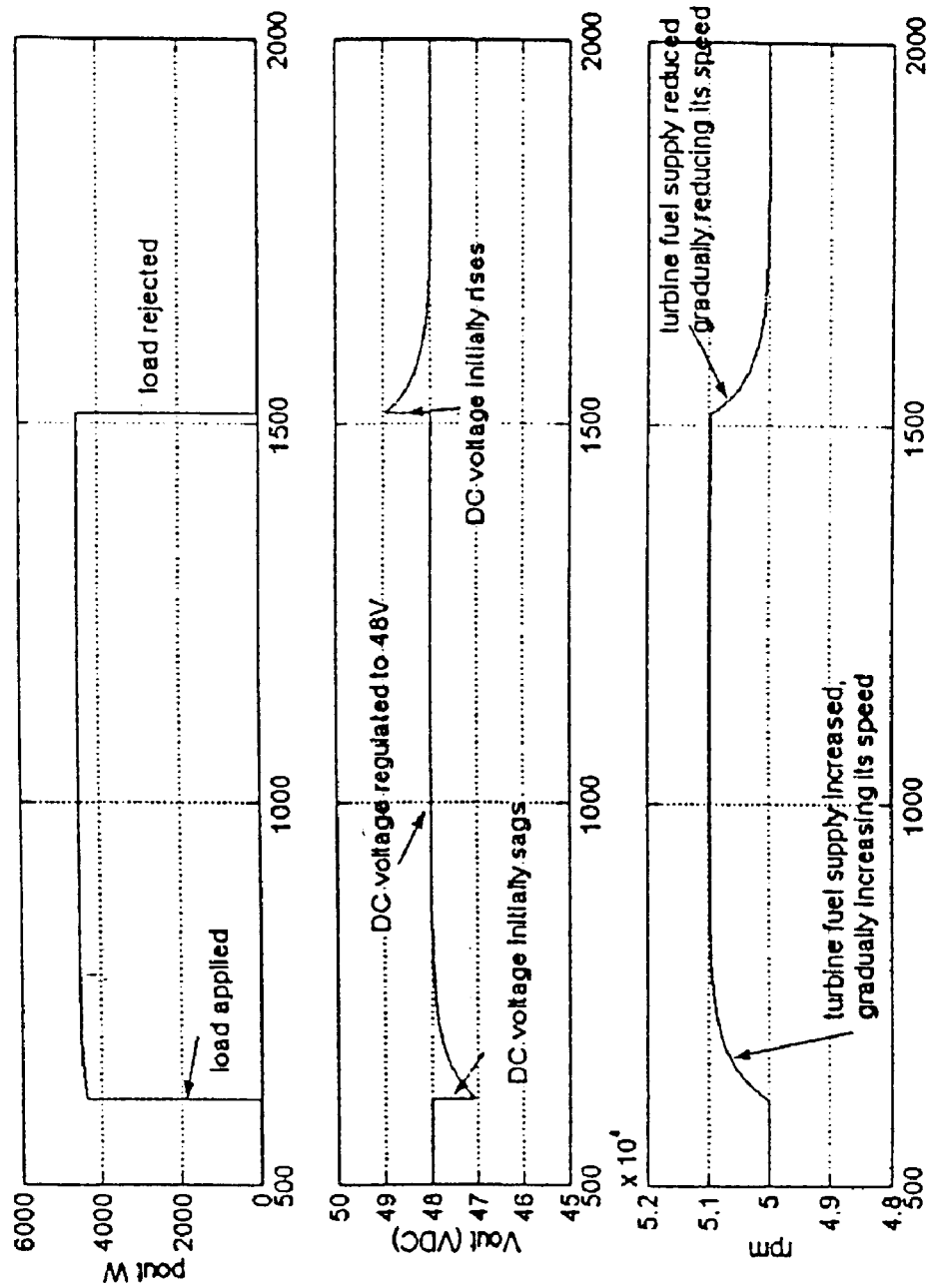
FIG. 2 is a graphical simulation of DC load requirements, DC load voltage, and turbine rpm with respect to time in accordance with one embodiment of the present invention.

A deficiency in DC load voltage means that the predetermined load voltage level is not being met by utility grid 30 (or, if applicable, the combination of the utility grid and a backup generator). More specifically, when utility grid 30 power is unable to provide sufficient power for a demanded load, as shown in the simulation of FIG. 2, the load voltage sags. In one embodiment, controller 18 detects such voltage sag via a voltage sensor 36 on DC bus 38. When the voltage sensed by voltage sensor 36 reaches a minimum acceptable level, the controller causes fuel source 14 to increase the supply of fuel. Transiently, the turbine starts to meet the load requirements as soon as the DC bus voltage starts to sag. Likewise, when the utility grid comes back on-line or otherwise meets the demanded load, the voltage on DC bus 38 rises slightly and thereby reduces the load demanded of the turbine and the corresponding need for fuel. The appropriate increase or decrease in fuel can be controlled by calculations and at least one feedback loop which will vary depending upon the particular application. In one embodiment, a DC current sensor 26 is useful for estimating the amount of power that is being delivered.

If desired, UPS system 10 may optionally further comprise an energy storage system 22 with controller 18 being configured to maintain the substantially constant DC load voltage both by adjusting the amount of fuel supplied by the fuel source to the turbine and by adjusting an amount of supplemental DC power supplied by the energy storage system for use by the load. Energy storage system 22 can be useful to absorb and source transient power while the turbine control reacts to changes in the load. In one embodiment, for example, controller 18 is configured to cause the energy storage system to supply supplemental DC power for use by the load in response to the deficiency in DC load voltage until the increased level of fuel supplied by the fuel source is sufficient to remove the deficiency in DC load voltage. Energy storage system may comprise systems such as, for example, batteries, flywheels, superconducting magnetic energy storage systems, or combinations thereof. The size of any such energy storage system 22, however, can be much less than that of conventional energy storage systems. The energy storage system can be configured to supply the rated load power for the duration of a transient of the turbine-alternator combination. For example, a 200 kW turbine-alternator combination can be designed to have a fuel system response time of under 5 seconds. In such an instance, the energy storage required to support a 200 kW load would be in the order of 0.3 kilowatt-hours which is estimated to occupy less than 5 square feet of floor space (compared to the 150 square feet that would typically be needed for an 8 hour ride-through). In one embodiment, in response to an excess in DC load voltage, the energy storage system is used to absorb excess DC power. In a more specific embodiment the absorbing of excess DC power by the energy storage system is combined with supplying a decreased level of fuel in response to an excess in DC load voltage.

If desired, UPS system 10 may optionally further comprise (either with or without the energy storage system 22 option) a backup AC generator 32. In this embodiment, a transfer switch 34 can be adapted to selectively provide AC power from the backup AC generator or a utility grid 30, and a main rectifier 28 can be adapted to convert AC power passing through the transfer switch to DC power at the predetermined voltage level for use by the load. This embodiment provides additional redundancy at the front end.

The previously described embodiments of the present invention have many advantages, including, for example, the advantage of a UPS system which can be fabricated using a much smaller footprint to deliver the same reliable DC power.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A direct current (DC) uninterruptible power supply (UPS) system comprising:
   (a) a turbine:
   (b) a fuel source adapted to continuously supply fuel to the turbine during normal UPS system operation;
   (c) an alternator adapted to convert mechanical power from the turbine into alternating current (AC) electrical power;
   (d) a turbine rectifier adapted to convert AC electrical power from the alternator to DC electrical power within a predetermined voltage level range for use by a load; and
   (e) a controller configured to maintain a DC load voltage within the predetermined voltage level range by adjusting the amount of fuel supplied by the fuel source to the turbine.

2. The system of claim 1 wherein the controller is configured to cause the fuel source (i) to continuously supply a minimum level of fuel to the turbine during normal UPS system operation, (ii) to supply an increased level of fuel in response to a deficiency in DC load voltage, and, in the event that an increased level of fuel has been supplied, (iii) to supply a decreased level of fuel in response to an excess in DC load voltage.

3. The system of claim 2 wherein the controller is configured to cause the fuel source to supply a decreased level of fuel in response to a user command.

4. The system of claim 2 further comprising an energy storage system, and wherein the controller is configured to maintain the DC load voltage within the predetermined voltage level range by adjusting the amount of fuel supplied by the fuel source to the turbine and by adjusting an amount of supplemental DC electrical power supplied by the energy storage system for use by the load.

5. The system of claim 4 wherein the controller is configured to cause the energy storage system to supply supplemental DC electrical power for use by the load in response to the deficiency in DC load voltage until the increased level of fuel supplied by the fuel source is sufficient to remove the deficiency in the DC load voltage.

6. The system of claim 2 further comprising a backup AC generator;

a transfer switch adapted to selectively provide AC power from the backup AC generator or a utility grid; and a main rectifier adapted to convert AC electrical power passing through the transfer switch to DC electrical power at the predetermined voltage level for use by the load.

7. The UPS system of claim 2 wherein the fuel is a natural gas fuel, a diesel fuel, an alcohol-based fuel, or mixtures thereof.

8. The UPS system of claim 7 wherein the controller is a computer, a microprocessor, or a digital signal processor.

9. A direct current (DC) uninterruptible power supply (UPS) system comprising:

(a) a turbine;

(b) a fuel source adapted to continuously supply fuel to the turbine during normal UPS system operation;

(c) an alternator adapted to convert mechanical power from the turbine into alternating current (AC) electrical power;

(d) a turbine rectifier adapted to convert AC electrical power from the alternator to DC electrical power within a predetermined voltage level range for use by a load;

(e) an energy storage system; and (f) a controller configured to maintain a DC load voltage within the predetermined voltage level range by (i) adjusting an amount of supplemental DC electrical power supplied by the energy storage system for use by the load, and (ii) causing the fuel source (aa) to continuously supply a minimum level of fuel to the turbine during normal UPS system operation, (bb) to supply an increased level of fuel in response to a deficiency in DC load voltage, and, in the event that an increased lever of fuel has been supplied, (cc) to supply a decreased level of fuel in response to an excess in DC load voltage.

10. The system of claim 9 wherein the controller is configured to cause the fuel source to supply a decreased level of fuel in response to a user command.

11. The system of claim 9 wherein the controller is configured to cause the energy storage system to supply supplemental DC electrical power for use by the load in response to the deficiency in DC load voltage until the increased level of fuel supplied by the fuel source is sufficient to remove the deficiency in the DC load voltage.

12. A direct current (DC) uninterruptible power supply (UPS) system comprising:

(a) a turbine;

(b) a fuel source adapted to continuously supply fuel to the turbine during normal UPS system operation;

(c) an alternator adapted to convert mechanical power from the turbine into alternating current (AC) electrical power;

(d) a turbine rectifier adapted to convert AC electrical power from the alternator to DC electrical power within a predetermined voltage level range for use by a load;

(e) a backup AC generator;

(f) a transfer switch adapted to selectively provide AC power from the backup AC generator or a utility grid;

(g) a main rectifier adapted to convert AC electrical power passing through the transfer switch to DC electrical power at the predetermined voltage level for use by the load; and (h) a controller configured to maintain a DC load voltage within the predetermined voltage level range by causing the fuel source (i) to continuously supply a minimum level of fuel to the turbine during normal UPS system operation, (ii) to supply an increased level of fuel in response to a deficiency in DC load voltage, and, in the event that an increased level of fuel has been supplied, (iii) to supply a decreased level of fuel in response to an excess in DC load voltage.

13. A method for providing a direct current (dc) uninterruptible power supply comprising:

(a) continuously supplying fuel to a turbine;

(b) converting mechanical power from the turbine into alternating current (AC) electrical power;

(c) converting the AC electrical power to DC power within a predetermined voltage level range;

(d) supplying the DC power to a load; and (e) maintaining a DC load voltage within the predetermined voltage level range by adjusting the amount of fuel supplied to the turbine.

14. The method of claim 13 wherein maintaining the DC load voltage within the predetermined voltage level range by adjusting the amount of fuel supplied to the turbine comprises (i) continuously supplying a minimum level of fuel to the turbine, (ii) supplying an increased level of fuel in response to a deficiency in DC load voltage, and, in the event that an increased level of fuel has been supplied, (iii) supplying a decreased level of fuel in response to an excess in DC load voltage.

15. The system of claim 14 wherein maintaining the DC load voltage within the predetermined voltage level range by adjusting the amount of fuel supplied to the turbine further comprises supplying a decreased level of fuel in response to a user command.

16. The method of claim 14 wherein maintaining the DC load voltage within the predetermined voltage level range further comprises obtaining supplemental DC power from an energy storage system and supplying the supplemental DC power to the load.

17. The method of claim 16 wherein supplying the supplemental DC power comprises supplying the supplemental DC electrical power in response to the deficiency in DC load voltage until the increased level of fuel is sufficient to remove the deficiency in DC load voltage.

18. A method for providing a direct current (DC) uninterruptible power supply comprising:

(a) continuously supplying fuel to a turbine;
(b) converting mechanical power from the turbine into alternating current (AC) electrical power;
(c) converting the AC electrical power to DC power within a predetermined voltage level range;
(d) supplying the DC power to a load; and
(e) maintaining a DC load voltage within the predetermined voltage level range by
  (i) continuously supplying a minimum level of fuel to the turbine,
  (ii) in response to a deficiency in DC load voltage. (aa) obtaining supplemental DC power from an energy storage system and supplying the supplemental DC power to the load, and (bb) supplying an increased level of fuel in response to a deficiency in DC load voltage, and
  (iii) in the event that an increased level of fuel has been supplied, in response to an excess in DC load voltage, (aa) supplying a decreased level of fuel and (bb) using the energy storage system to absorb excess DC power.

19. The method of claim 18 wherein supplying the supplemental DC power comprises supplying the supplemental DC electrical power until the increased level of fuel is sufficient to remove the deficiency in DC load voltage.

* * * * *